(12) United States Patent
Cheng et al.

(10) Patent No.: US 9,008,207 B2
(45) Date of Patent: Apr. 14, 2015

(54) UPLINK NOISE ESTIMATION FOR VIRTUAL MIMO

(75) Inventors: Peng Cheng, Beijing (CN); Changlong Xu, Beijing (CN); Xuebin Yang, Beijing (CN); Feng Zhou, Beijing (CN); Yang Gao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 13/878,708

(22) PCT Filed: Oct. 11, 2010

(86) PCT No.: PCT/CN2010/001585
§ 371 (c)(1),
(2), (4) Date: Nov. 21, 2013

(87) PCT Pub. No.: WO2012/048439
PCT Pub. Date: Apr. 19, 2012

(65) Prior Publication Data
US 2014/0064391 A1  Mar. 6, 2014

(51) Int. Cl.
*H04B 7/02* (2006.01)
*H04L 25/03* (2006.01)
(Continued)

(52) U.S. Cl.
CPC .......... *H04L 25/03197* (2013.01); *H04B 7/024* (2013.01); *H04B 17/0055* (2013.01); *H04B 7/0413* (2013.01)

(58) Field of Classification Search
CPC ............. H04B 7/15585; H04B 7/0452; H04L 5/0048; H04L 5/0094; H04L 5/0007; H04W 24/10; H04W 72/042; H04W 24/02; H04W 72/082; H04W 24/08; H04W 52/243; H04W 24/00

USPC ................. 375/267, 254, 285, 144, 227, 346; 455/39; 370/252
See application file for complete search history.

(56) References Cited

U.S. PATENT DOCUMENTS

| 7,688,905 | B1 | 3/2010 | Yucek et al. | |
|---|---|---|---|---|
| 2007/0201568 | A1* | 8/2007 | Bae et al. | ...................... 375/260 |

FOREIGN PATENT DOCUMENTS

| CN | 1701547 A | 11/2005 |
|---|---|---|
| CN | 101322365 A | 12/2008 |

(Continued)

OTHER PUBLICATIONS

International Search Report and Written Opinion for International Application No. PCT/CN2010/001585, mailed on Jul. 21, 2011, 10 pages.

(Continued)

*Primary Examiner* — Leila Malek
(74) *Attorney, Agent, or Firm* — Thorpe North & Western LLP

(57) ABSTRACT

A system and methods for estimating a noise power level in an uplink signal for a virtual MIMO system is disclosed. The system comprises a demodulation reference signal (DMRS) module configured to obtain a DMRS receive symbol from the uplink signal and determine a DMRS sequence for a first UE in the virtual MIMO system. An autocorrelation module is configured to calculate an average autocorrelation value for the subcarriers in the uplink signal. A cross-correlation module is configured to calculate first and second cross-correlation values of the uplink signal $R_Z(l)$ for values of l selected such that the sum of the received power from the first UE and the second UE can be accurately estimated. A noise power level module is configured to determine the noise power level for the uplink signal using the average autocorrelation value and the first and second cross correlation values.

22 Claims, 6 Drawing Sheets

(51) Int. Cl.
*H04B 17/00* (2006.01)
*H04B 7/04* (2006.01)

(56) References Cited

FOREIGN PATENT DOCUMENTS

| WO | 2012/048439 A1 | 4/2012 |
| WO | 2012048439 A1 | 4/2012 |

OTHER PUBLICATIONS

International Search Report and Written Opinion received for PCT application No. PCT/CN2010/001585, mailed on Jul. 21, 2011, 10 pages.

International Preliminary Report on Patentability received for PCT application No. PCT/CN2010/001585, mailed on Apr. 25, 2013, 6 pages.

* cited by examiner

UPLINK NOISE ESTIMATION FOR VIRTUAL MIMO

This application is a National Stage of PCT/CN2010/001585, filed on Oct. 11, 2010, entitled "UPLINK NOISE ESTIMATION FOR VIRTUAL MIMO", of which is herein incorporated by reference in its entirety.

BACKGROUND

When information is transmitted over a wireless channel then the received signal can be distorted due to the effects of multipath transmissions. Multipath transmissions can be caused by reflections of the transmitted signal off of objects such as buildings, vehicles, and other types of obstructions. The result is that multiple copies of the transmitted signal arrive at the receiver, with each signal having a certain time delay. The amount of the time delay is proportional to the length of the path the signal traveled. Obviously, signals that are reflected multiple times will travel a longer path than a signal with a direct line of sight.

The amount of time between a first signal (typically the line of sight signal) and a last reflected signal arrive at the receiver is referred to as the delay spread. In cellular communication applications delay spreads can be on the order of several microseconds. The delay induced by multipath can cause a symbol received along a delayed path to "bleed" into a subsequent symbol arriving at the receiver via a more direct path. This is typically referred to as inter-symbol interference (ISI). In a single carrier communication system, the symbol times decrease as the data rates increase. At very high data rates (with correspondingly shorter symbol periods) it is possible for ISI to exceed an entire symbol period and spill into a second or third subsequent symbol. This can cause significant problems at the receiver.

In addition to problems in the time domain, there can be additional problems in the frequency domain due to multipath distortion. As the multiple reflected signals are combined at the receiver, some frequencies within the signal passband can undergo constructive interference (a linear summation of in-phase signals), while other signals may undergo destructive interference (a linear summation of out-of-phase signals). This can result in a composite received signal that is distorted by frequency selective fading. The ability to estimate signal power and noise power for a received signal can significantly improve the ability to receive a signal that has distortion.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
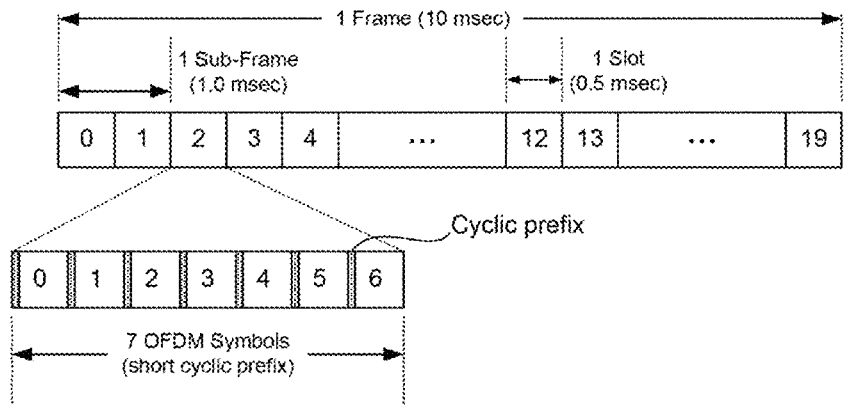
FIG. 1 provides an example illustration of an LTE frame structure.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Single carrier systems compensate for channel distortion via time domain equalization. Generally, time domain equalizers compensate for multipath induced distortion by one of two methods:

1. Channel inversion: A known sequence is transmitted over the channel prior to sending information. Because the original signal is known at the receiver, a channel equalizer is able to determine the channel response and multiply the subsequent data-bearing signal by the inverse of the channel response to substantially reverse the effects of the multipath.
2. CDMA systems can employ rake equalizers to resolve the individual paths and then combine digital copies of the received signal shifted in time to enhance the received signal-to-noise ratio (SNR).

In either case, channel equalization implementation becomes increasingly complex as data rates increase. Symbol times become shorter and receiver sample clocks are selected that are proportionally faster. This leads to more severe inter-symbol interference that may span several symbol periods.

Data sent on single carrier signals can only be increased by increasing the data rate. In order to reduce inter-symbol interference while allowing an increase in data rates, the data can be sent on multiple parallel paths. For instance, in Orthogonal Frequency Division Modulation (OFDM), the communication systems do not rely on increased symbol rates in order to achieve higher data rates. Rather, OFDM systems break the available bandwidth into many sub-carriers having a narrower frequency bandwidth and transmit the data in parallel streams. Each OFDM symbol is a linear combination of the instantaneous signals of each of the sub-carriers in the channel. Because data is transmitted in parallel rather than serially, OFDM symbols are typically substantially longer than symbols on a single carrier system of equivalent data rate.

Each OFDM symbol is typically preceded by a cyclic prefix (CP). The length of the CP is selected so that preceding symbols do not spill over into the data portion of the signal, which is also referred to as the fast Fourier transform (FFT) period. Thus, the CP can be used to effectively eliminate ISI.

However, since the OFDM symbol is a linear combination of the instantaneous signals in the sub-carriers, the signal can have a large peak-to-average power ratio (PAPR). This can reduce the efficiency of the transmitter radio frequency power amplifier (RFPA) and create a need for analog to digital and digital to analog converters with a high dynamic range.

Sub-carriers in OFDM signals can be very tightly spaced to make efficient use of available bandwidth. The close spacing of sub-carriers is possible due to the orthogonality of the sub-carriers. An OFDM system can achieve zero inter-carrier interference (ICI) if each subcarrier is sampled precisely at its center frequency. However, the transmitter and receiver local oscillators used to perform down conversion of the radio frequency carrier signal will invariably drift, so active means are used to keep them synchronized. Each base station periodically sends synchronization signals which are used by User Equipment (UE) (i.e. the user's cell phone or mobile computing device) to stay in sync with the base station clock. Even so, other sources such as Doppler shifts and oscillator phase noise can still result in frequency errors. Uncorrected frequency errors can result in ICI. The signal frequency can be tracked continuously to correct offsets in the baseband processor to avoid excessive ICI that may result in dropped packets.

The $3^{rd}$ Generation Partnership Project (3GPP) Long Term Evolution (LTE) advanced mobile communication standard was submitted as a candidate $4^{th}$ generation (4G) system to the Telecommunication Standardization Sector (ITU-T) in the Fall of 2009 and is expected to be adopted in 2011. The proposed standard uses OFDM Multiple Access (OFDMA) in the physical layer generic frame structure. FIG. 1 provides an example illustration of an LTE frame structure. LTE frames are 10 milliseconds (msec) in duration. Each frame is divided into 10 subframes, with each subframe being 1.0 msec long. Each subframe is further divided into two slots that are each 0.5 msec in duration. Slots can include of either 6 or 7 OFDM symbols and cyclic prefixes, depending on whether the normal or extended cyclic prefix is employed.

Figure 2:
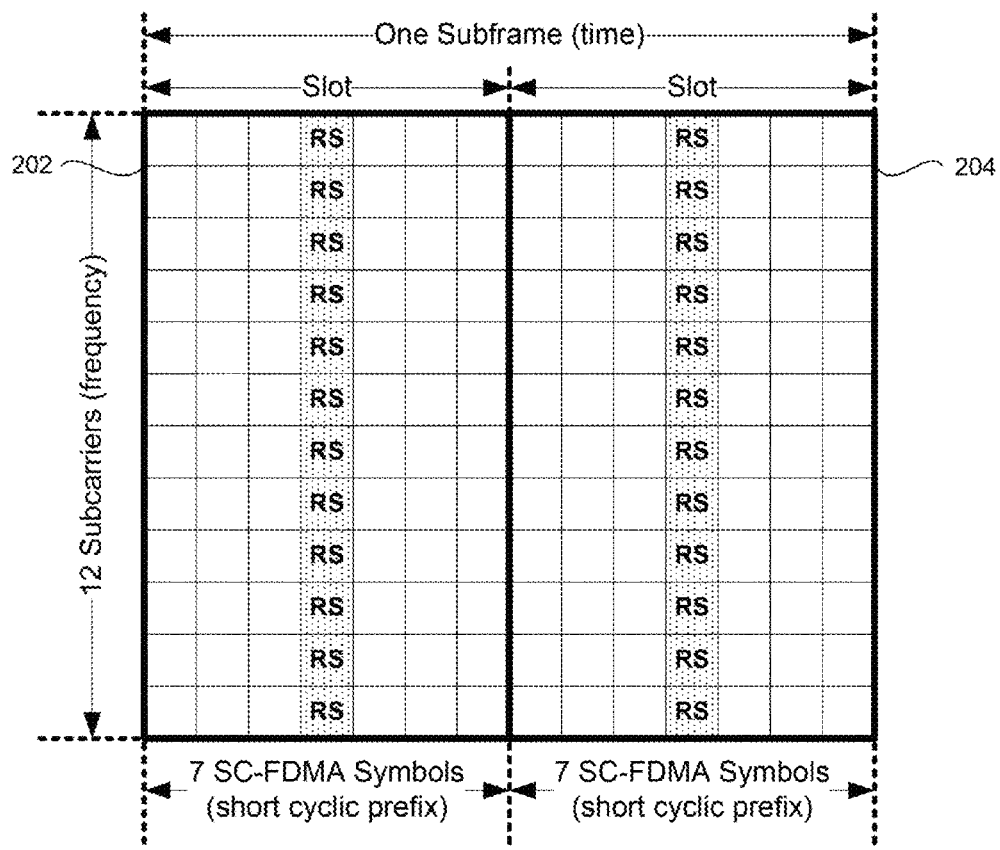
FIG. 2 provides a block diagram of an example subframe that is comprised of two slots.

In OFDMA, users are allocated a specific number of sub-carriers for a predetermined amount of time. The minimum number of subcarriers over a minimum amount of time in the LTE standard is referred to as a physical resource block (PRB), which represents the smallest subdivision. Each PRB is defined in the LTE standard as comprising 12 consecutive subcarriers for one slot (either 6 or 7 OFDM symbols in 0.5 msec) of duration. FIG. 2 shows an example subframe that is comprised of two slots, providing a first PRB 202 and a second PRB 204.

Rather than using a preamble to facilitate a carrier offset estimate, channel estimation, timing synchronization, and so forth, LTE uses special reference signals that are embedded in the PRBs, as shown in FIG. 2 by the designation of "RS". In the uplink, the reference signals may be transmitted during the 4th symbol of each slot when the short CP is used. The channel response of subcarriers bearing the reference symbols can be computed directly. Interpolation can be used to estimate the channel response on the remaining subcarriers.

SC-FDMA

Limiting power consumption for wireless connections with user equipment (UE) enables the devices to operate longer on a single battery charge. The UE may be a cell phone, a mobile computing device such as a mobile internet devices, a tablet computing device, a laptop computer, an embedded communication device in a vehicle, and so forth. As previously discussed, the use of OFDM causes a relatively large peak-to-average power ratio (PAPR). This can reduce the efficiency of the transmitter radio frequency power amplifier (RFPA) and create a need for analog to digital and digital to analog converters with a high dynamic range, thereby reducing efficiency.

In order to increase the efficiency by reducing the PAPR, the LTE standard suggests the use of Single-Carrier Frequency Division Multiple Access (SC-FDMA) for uplink communication from the UE to the base station. The basic transmitter and receiver architecture is very similar to OFDMA, and it offers the same degree of multipath protection, while reducing the PAPR since the underlying waveform is essentially single-carrier.

However, the term "single-carrier" is somewhat of a misnomer, as SC-FDMA transmissions can be thought of as linear summations of discrete subcarriers. The LTE frame structure for an SC-FDMA downlink is the same as the structure illustrated in FIG. 2, though different reference signals may be used. The reference signals in each uplink PRB may also be communicated at different locations in the PRB than is illustrated in FIG. 2. These details are disclosed in the 3GPP LTE standard.

Figure 3:
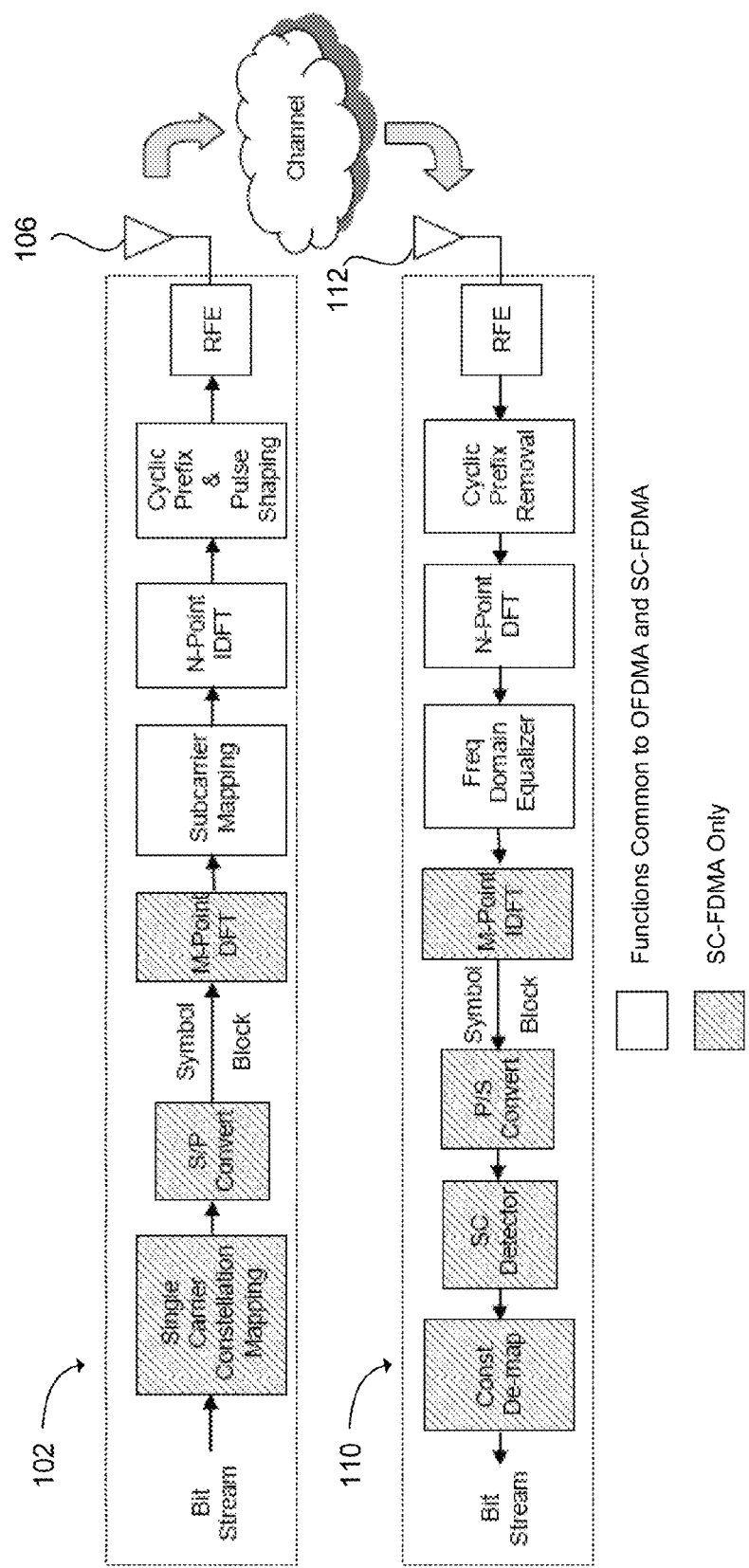
FIG. 3 illustrates a block diagram of an example SC-FDMA transmitter/receiver.

FIG. 3 illustrates a block diagram of an example SC-FDMA transmitter/receiver. Many of the functional blocks are common to both the SC-FDMA used by the uplink and the OFDMA used by the downlink. The functional blocks in the transmit side chain 102 include:

Constellation mapper: Converts incoming bit stream to single carrier symbols (BPSK, QPSK, or 16 QAM depending on channel conditions);

Serial/parallel converter: Formats the time domain single carrier symbols into blocks for input to the fast Fourier transform engine;

M-point DFT: Converts each time domain single carrier symbol block into M discrete tones using discrete Fourier transform;

Subcarrier mapping: Maps discrete Fourier transform output tones to specified subcarriers for transmission. SC-FDMA systems can either use contiguous tones (localized) or uniformly spaced tones (distributed);

N-point IDFT: Converts mapped subcarriers back into time domain (using inverse discrete Fourier transform) for transmission;

Cyclic prefix and pulse shaping: Cyclic prefix is prepended to the composite SC-FDMA symbol to provide multipath immunity in the same manner as described for OFDM; pulse shaping is employed to prevent spectral regrowth; and RFE: Converts the digital signal to analog and upconverts the signal for radio frequency transmission;

One or more antennas 106 can be used to transmit the radio frequency signal. Any type of antenna may be used including, for example, dipoles, patch antennas, helical antennas, and so forth.

In the receive side chain 110, the process is effectively reversed. Multipath distortion for an SC-FDMA signal can be handled with the removal of the cyclic prefix, conversion of the signal to frequency domain, and a channel correction applied on a subcarrier-by-subcarrier basis. While the SC-FDMA signal that is represented by the discrete subcarriers is actually single carrier. Unlike an OFDM signal, SC-FDMA subcarriers are not independently modulated. As a result, PAPR is lower than for OFDM transmissions.

MIMO

The use of multiple transmit antennas and multiple receive antennas, commonly referred to as Multiple Input Multiple Output (MIMO), can provide significant increases in data throughput and link range without additional bandwidth or transmit power. MIMO achieves the increase in data throughput and range by enabling higher spectral efficiency (more bits per second per hertz of bandwidth) and an improvement in link reliability and/or diversity (reduced fading).

The number of antennas used in a MIMO system can vary. The number of transmitter antennas may be the same as the number of receive antennas, such as a 2×2 or 3×3 array. Alternatively, more antennas may be located on one side, such as a 2×3 or 2×4 array. Typically, a UE is limited in the number of antennas that can be located on the device. This is due to spatial separation requirements that are needed to provide adequate spatial diversity for the antennas. A base station, however, can typically incorporate a desired number of antennas with a sufficient separation.

Figure 4:
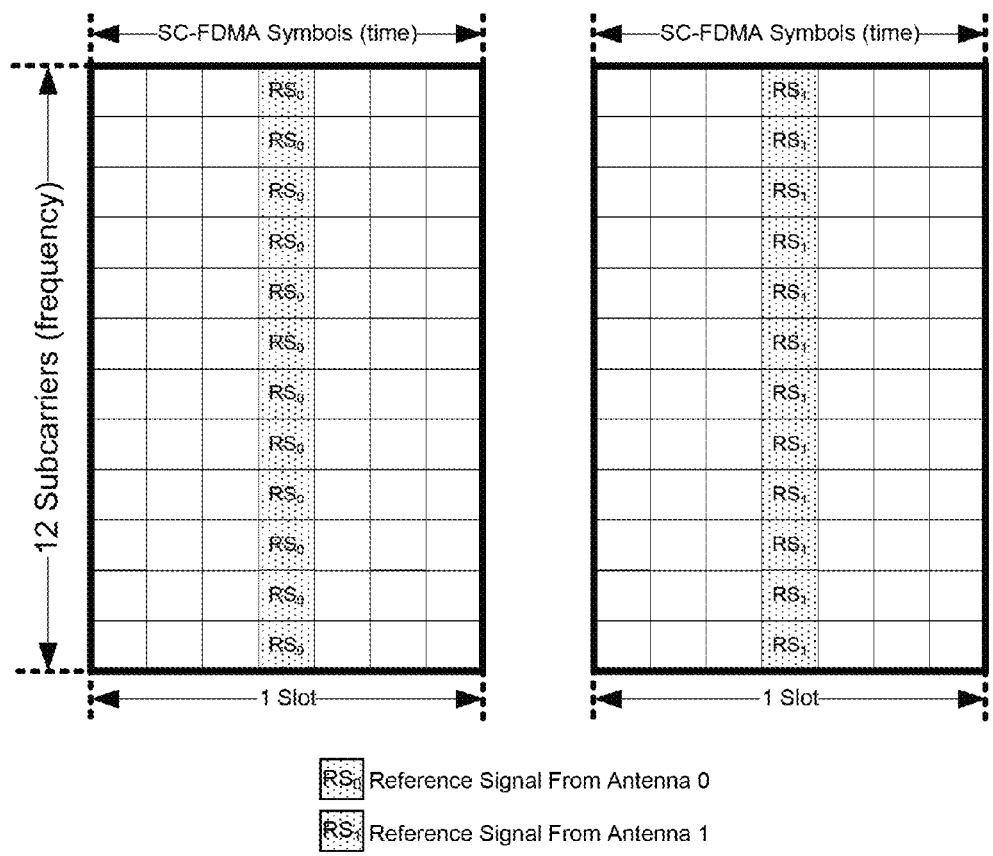
FIG. 4 provides a block diagram of example subframes received from two separate transmit antennas.

In order to successfully receive a MIMO transmission, a receiver can determine the channel impulse response from each transmitting antenna. In LTE, the channel impulse response for each channel is determined by sequentially transmitting known reference signals from each transmitting antenna, as shown in FIG. 4. Once a channel impulse response has been determined for each channel then the channels can be used to communicate simultaneously. In a 2×2 MIMO system, there are a total of four channel impulse responses corresponding to the four separate channels that can be formed between the antennas.

Many types of user equipment, such as cell phones and other types of handheld computing devices do not have a sufficient size to incorporate multiple antennas with adequate spacing between the antennas. The advantages of MIMO can still be obtained through partnering with the antennas of other devices. The coordination of transmission and reception using the single or multiple antenna(s) of two or more separate devices to one or more devices having at least two antennas is commonly referred to as virtual MIMO.

For instance, two devices having a single antenna can be configured to coordinate transmission to two additional devices that each has a single antenna. Typically, a virtual MIMO system is comprised of two or more devices having at least one antenna that coordinate transmission to a base station with at least two antennas.

Estimating Noise Power for Virtual MIMO

One challenge for communicating with virtual MIMO is that a high level of precision in channel estimation is typically used to enable virtual MIMO. Channel estimation and equalization in an LTE uplink receiver using minimum mean square error (MMSE) requires an estimation of noise power. An estimation of noise power is also used to select an optimal modulation and coding scheme to improve a system's spectrum efficiency. In the case of uplink virtual MIMO, two different user equipment devices transmit in the same space-time resource blocks. This can cause inter-user interference, which increases the difficulty of noise power estimation.

In accordance with one embodiment of the present invention, a system and method for virtual MIMO uplink noise power estimation is disclosed. The system and method use the LTE's demodulation reference signal (DRMS) sequence structure. The estimation only needs to calculate three correlation values for each DMRS symbol, thereby enabling a low complexity.

The algorithms disclosed below describe a noise power estimation process for a virtual MIMO LTE uplink with two UEs (1,2). It can be assumed that the received data at the m-th symbol and the n-th subcarrier can be expressed as follows:

$$Y_{m,n} = d_{m,n}^1 \sqrt{S_1 P_1} H_{m,n}^1 + d_{m,n}^2 \sqrt{S_2 P_2} H_{m,n}^2 + \sqrt{W} w_{m,n} \quad (1),$$

where $H_{m,n}^i$ (i=1,2) is the channel frequency response of $UE_i$ (i=1,2), $S_i$ (i=1,2) is the average power of $UE_i$ (i=1,2), $P_i$ (i=1,2) is the average power of the channel response on the $UE_i$ channel (i=1,2), $d_{m,n}^i$ is the DMRS symbol of $UE_i$ (i=1,2), $w_{m,n}$ is the additional Guassian white noise whose variance is 1 and mean value is zero, and W is noise power. The objective is to estimate the noise power W.

The autocorrelation function of $Y_{m,n}$ is defined as $$\begin{aligned}
R_Y(l) &= E\{Y_{m,n} Y_{m,n+l}^H\} \quad (2)\\
&= E\{(\sqrt{S_1 P_1}\, d_{m,n}^1 H_{m,n}^1 + d_{m,n}^2 \sqrt{S_2 P_2}\, H_{m,n}^2 + \sqrt{W}\, w_{m,n})\\
&\quad (\sqrt{S_1 P_1}\, (d_{m,n+l}^1 H_{m,n+l}^1)^H + \sqrt{S_2 P_2}\, (d_{m,n}^2 H_{m,n}^2)^H +\\
&\quad \sqrt{W}\, w_{m,n+l}^H)\}\\
&= S_1 P_1 E\{d_{m,n}^1 (d_{m,n+l}^1)^H H_{m,n}^1 (H_{m,n+l}^1)^H\} + S_2 P_2 E\{d_{m,n}^2 (d_{m,n+l}^2)^H,\\
&\quad H_{m,n}^2 (H_{m,n+l}^2)^H\} + W E\{w_{m,n} w_{m,n+l}^H\}\\
&= S_1 P_1 E\{d_{m,n}^1 (d_{m,n+l}^1)^H H_{m,n}^1 (H_{m,n+l}^1)^H\} + S_2 P_2 E\\
&\quad \{d_{m,n}^2 (d_{m,n+l}^2)^H H_{m,n}^2 (H_{m,n+l}^2)^H\} + W R_w(l)
\end{aligned}$$

where the notation $E\{\cdot\}$ represents an expected value, superscript H represents a conjugate transpose, and $R_w(l)$ is the autocorrelation function of noise every l subcarriers. When l=0, equation (2) can be reduced to, $$R_Y(0) = S_1 P_1 + S_2 P_2 + W \quad (3).$$

When l≠0 then equation (2) can be reduced with the specific DMRS sequence that is defined in the LTE standard. The DMRS sequence $d_{m,n}^i$ can be expressed as follows:

$$d_{m,n}^i = e^{-j \frac{\pi q n(n+1)}{N_{ZC}^{RS}}} e^{-j \frac{\pi \cdot n \cdot n_{cs}^i}{6}}, \quad (4)$$

where $N_{ZC}^{RS}$ is the length of the Zadoff-Chu sequence, q is determined by the group index used in the Zadoff-Chu sequence, and $n_{cs}^i$ is the cyclic shift of $UE_i$ (i=1,2). The autocorrelation of the DMRS sequence is:

$$d_{m,n+l}^i (d_{m,n}^i)^H = e^{-j\frac{\pi q(l^2+2nl+l)}{N_{ZC}^{RS}}} e^{-j\frac{\pi l \cdot n_{cs}^i}{6}}. \quad (5)$$

If the autocorrelation of the received signal $Y_{m,n}Y_{m,n+1}^H$ is multiplied by the autocorrelation of the DMRS sequence, the following result is obtained:

$$R_z(l) = E\{Y_{m,n}Y_{m,n+l}^H d_{m,n+l}^1 (d_{m,n}^1)^H\} \quad (6)$$
$$= S_1 P_1 E\{H_{m,n}^1 (H_{m,n+l}^1)^H\} + S_2 P_2 E$$
$$\left\{e^{-j\frac{\pi l(n_{cs}^1 - n_{cs}^2)}{6}} H_{m,n}^2 (H_{m,n+l}^2)^H\right\} + WE\{w_{m,n}w_{m,n+l}^H\}.$$

When l=12, it satisfies $$e^{-j\frac{\pi l(n_{cs}^1 - n_{cs}^2)}{6}} = 1,$$

and (6) can be reduced to:

$$R_z(12) = S_1 P_1 E\{H_{m,n}^1 (H_{m,n+12}^1)^H\} + S_2 P_2 E \quad (7)$$
$$\{H_{m,n}^2 (H_{m,n+12}^2)^H\} + WE\{w_{m,n}w_{m,n+12}^H\}.$$
$$= (S_1 P_1 + S_2 P_2) R_H(12)$$

where $R_H(l)$ represents the autocorrelation functions of a channel.

The autocorrelation functions of a channel satisfies:

$$R_H(l) = E\{H_{m,n}H_{m,n+l}^H\} \quad (8)$$
$$= J_0(2\pi f_d T l)$$
$$\approx 1 - l^2(\pi f_d T)^2,$$

where $f_d$ is the channel Doppler frequency, T is the symbol duration, and $J_0(\square)$ is the zero-th order Bessel function of the first kind. So, (8) can be reduced to:

$$R_Z(12) = (S_1 P_1 + S_2 P_2)[1 - 144(\pi f_d T)^2] \quad (9).$$

Following the same procedure for l=24:

$$R_Z(24) = (S_1 P_1 + S_2 P_2)[1 - 576(\pi f_d T)^2] \quad (10).$$

Based on equations (9) and (10), the following can be obtained:

$$S_1 P_1 + S_2 P_2 = \frac{4R_Z(12) - R_Z(24)}{3}. \quad (11)$$

Using equation (11), noise power can be estimated as:

$$W = R_Y(0) - (S_1 P_1 + S_2 P_2) \quad (12)$$
$$= R_Y(0) - \frac{4R_Z(12) - R_Z(24)}{3}.$$

Calculating Noise Power $R_Y(0)$ is the average of autocorrelation in all subcarriers, which is calculated with equation (2) and can be expressed specifically as:

$$R_Y(0) = \frac{\sum_{n=1}^{N} Y_{m,n}Y_{m,n}^H}{N} \quad (13)$$

The mathematical expectation value of $Y_{m,n}Y_{m,n}^H$ ($1 \leq n \leq N$) in equation (3) is $S_1 P_1 + S_2 P_2 + W$. Therefore:

$$E\{Y_{m,n}Y_{m,n}^H\} = \frac{\sum_{n=1}^{N} Y_{m,n}Y_{m,n}^H}{N} = R_Y(0) = S_1 P_1 + S_2 P_2 + W \quad (14)$$

Thus, the values of $S_1 P_1$, $S_2 P_2$, and W cannot be determined Therefore, $R_Y(0)$ cannot be calculated with $S_1 P_1 + S_2 P_2 + W$.

One way of calculating $S_1 P_1 + S_2 P_2 + W$ is to provide two values for $R_Z(l)$ in which the value of l is selected such that the ratio of $$\frac{\pi l}{6}$$

is equal to $r 2\pi$, where r is a positive integer. When this occurs then the sum of the received power from the first UE and the second UE can be accurately estimated. When the value of l is selected such that the ratio of $$\frac{\pi l}{6}$$

is not equal to $r 2\pi$ then the sum of the received power is an estimation of $$S_1 P_1 + e^{-j\frac{\pi l(n_{cs}^1 - n_{cs}^2)}{6}} S_2 P_2,$$

as show in equation (6). This estimation can significantly reduce the accuracy of the noise estimation.

Therefore, to provide a substantially accurate estimation of noise power in an uplink signal for a virtual MIMO system, the value of l can be selected such that the ratio of $$\frac{\pi l}{6}$$

is equal to $r 2\pi$. For instance, when the value of l is equal to twelve, $R_Z(12)$ is the average of the cross-correlation multiplied by the autocorrelation of the DMRS sequence every 12 subcarriers, which can be expressed as:

$$R_Z(12) = \frac{\sum_{n=1}^{N-12} Y_{m,n} Y_{m,n+12}^H d_{m,n+12}^1 (d_{m,n}^1)^H}{N - 12}. \quad (15)$$

The value $R_Z(24)$ is the average of cross-correlation multiplied by the autocorrelation of the DMRS sequence every 24 subcarriers, which can be expressed as:

$$R_Z(24) = \frac{\sum_{n=1}^{N-24} Y_{m,n} Y_{m,n+24}^H d_{m,n+24}^1 (d_{m,n}^1)^H}{N - 24}. \quad (16)$$

It can be appreciated that, mathematically, at every $12^{th}$ subcarrier (l=12) and every $24^{th}$ subcarrier (l=24), the sum of the received power from the first UE and the second UE can be accurately estimated, as discussed above. This enables the noise power to be accurately estimated using equation (12), thereby enabling the noise power to be accurately estimated for a virtual MIMO system having two different user equipment devices that transmit in the same space-time resource blocks.

Figure 5:
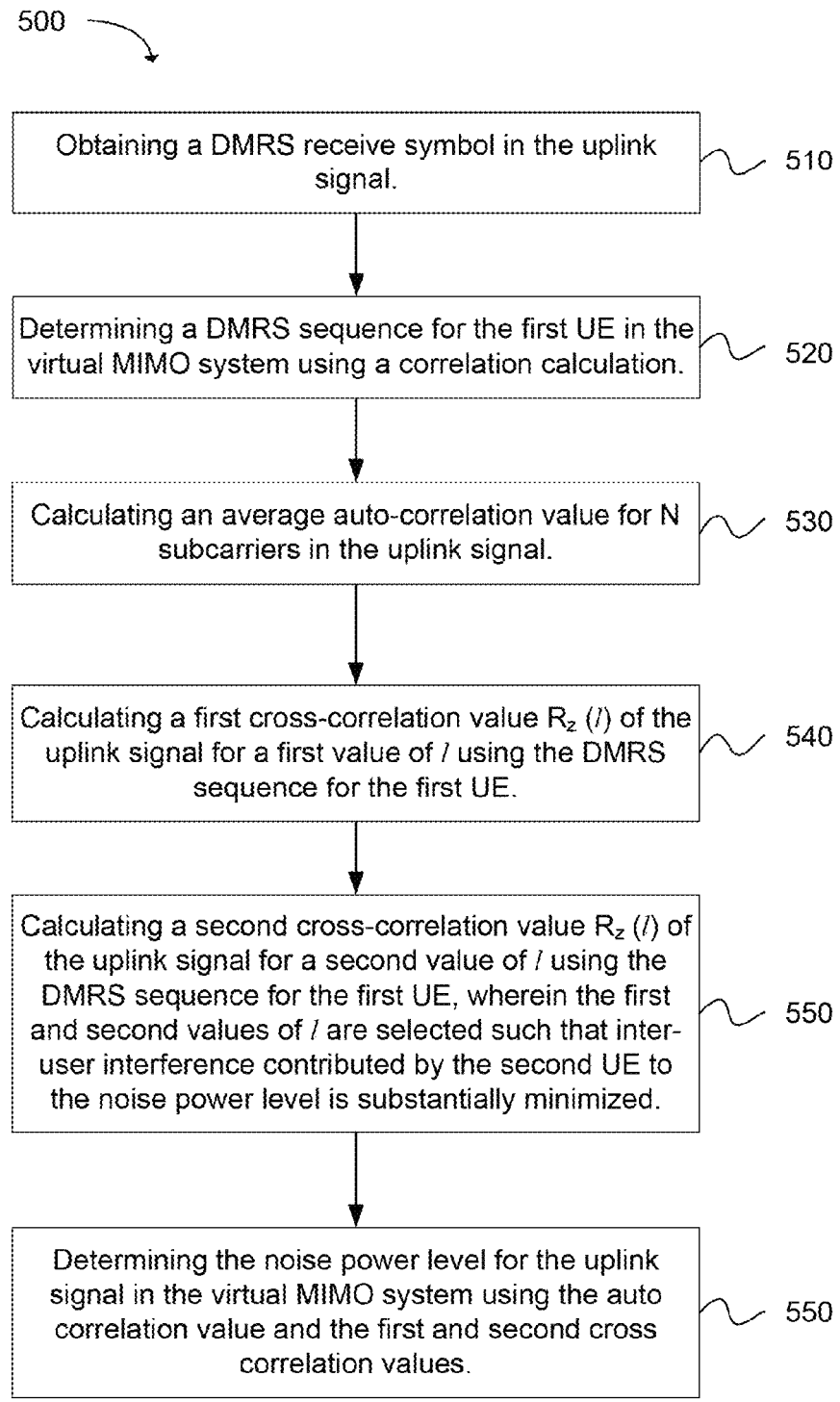
FIG. 5 depicts a flow chart of a method for estimating noise power in an uplink signal for a virtual multiple input multiple output (MIMO) system in accordance with an embodiment of the present invention.

In accordance with one embodiment of the present invention, a method 500 for estimating noise power in an uplink signal for a virtual multiple input multiple output (MIMO) system is disclosed, as depicted in the flow chart of FIG. 5. The method comprises obtaining 510 a demodulation reference signal (DMRS) receive symbol in the uplink signal. The DMRS receive symbol can be located at the $m^{th}$ symbol on the $n^{th}$ subcarrier of the uplink signal, where m is a positive integer and n is an integer value between 1 and N, where N is the total number of subcarriers in the uplink signal. A DMRS sequence for the first UE in the virtual MIMO system can then be determined 520 using a correlation calculation.

One type of correlation calculation that can be used to determine the DMRS sequence for the first UE in the virtual MIMO system is:

$$d_{m,n}^1 = \underset{\forall d_{m,n}^i \in \mathfrak{R}}{\operatorname{argmax}} \sum_{n=1}^N Y_{m,n} (d_{m,n}^i)^H,$$

where $\mathfrak{R}$ is the set of all possible DMRS sequences, as can be appreciated.

The method 500 further comprises calculating 530 an average autocorrelation value for N subcarriers in the uplink signal. In one embodiment, the average autocorrelation value can be determined using equation (13). A first cross-correlation value $R_Z(l)$ of the uplink signal can be calculated 540 for a first value of l using the DMRS sequence for the first UE. A second cross-correlation value $R_Z(l)$ of the uplink signal can be calculated 550 for a second value of l using the DMRS sequence for the first UE.

In one embodiment, the first and second cross-correlation values can be determined using equations 15 and 16, respectively, for l=12 and l=24. The first and second values of l can be selected to substantially minimize inter-user interference that is contributed by the second UE to the noise power level. For instance, the first value of l can be selected as 12 and the second value of l can be selected as 24. Other values of l that enable the ratio of $$\frac{\pi l}{6}$$

to equal r2π, where r is a positive integer, can also be used to calculate the first and second cross-correlation values. The values of l can be selected so that the first and second cross-correlation values are different. Equations (9) through (12) can be adapted based on the selected values of l.

The method 500 further includes determining 560 the noise power level for the uplink signal in the virtual MIMO system using the autocorrelation value and the first and second cross correlation values. In one embodiment, equation (12) can be used to calculate the noise power level for the uplink signal in the virtual MIMO system using the autocorrelation value and the first and second cross correlation values.

The signal power of the uplink signal for the first UE and the second UE in the virtual MIMO system can be determined using the first and second cross correlation values. For instance, equation (11) can be used to determine $S_1P_1+S_2P_2$. A substantially accurate estimation of the noise power level W for the uplink signal in the virtual MIMO system can then be used to perform a channel estimate for the uplink signal and equalize the uplink signal from the first and second user equipment devices. The estimation of the noise power level and channel estimate may be performed at the base station in the virtual MIMO system to allow the virtual MIMO uplink signal from the first UE and the second UE to be received.

Figure 6:
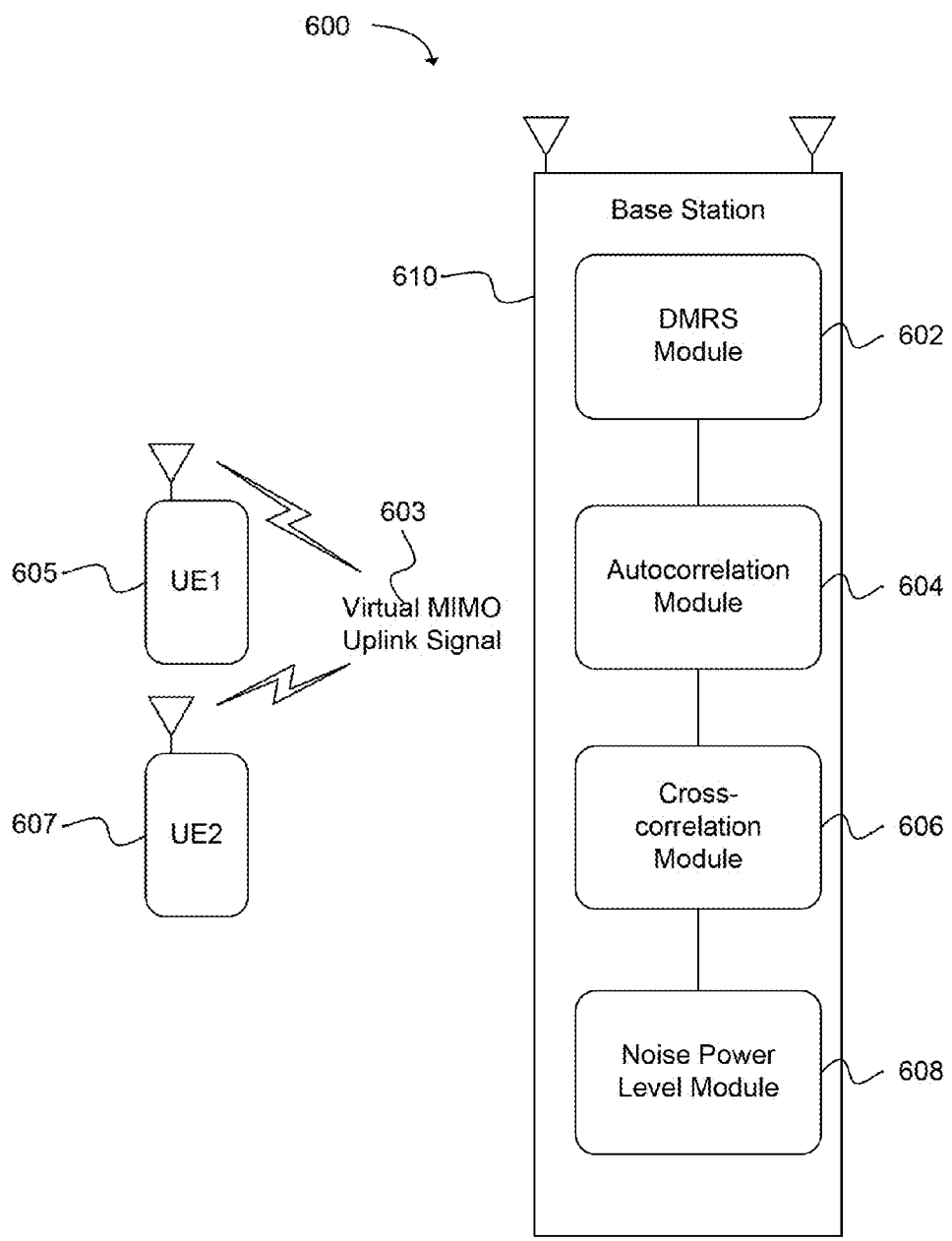
FIG. 6 provides an example illustration of a block diagram of a system for estimating noise power in an uplink signal for a virtual multiple input multiple output (MIMO) system in accordance with an embodiment of the present invention.

In another embodiment, a system for estimating a noise power level in an uplink signal for a virtual MIMO system is disclosed. One example illustration of a block diagram of the system 600 for estimating the noise power level is illustrated in FIG. 6. The virtual MIMO system can include a first UE 605 and a second UE 607 that transmit in the same space-time resource blocks. The uplink signal may be received at a base station 610. The base station may be a standard base station, such as an enhanced Node b type of base station. Alternatively, the base station may be a low power base station, such as a micro cell base station, a nano cell base station, or a pico cell base station.

The system 600 includes a DMRS module 602 that is configured to obtain a DMRS receive symbol from the uplink signal 603 and determine a DMRS sequence for the first UE in the virtual MIMO system using a correlation calculation.

The system 600 further comprises an autocorrelation module 604 that is configured to calculate an average autocorrelation value for N subcarriers in the uplink signal, where N is the total number of subcarriers in the uplink signal. In one embodiment, the average autocorrelation value can be determined using equation (13).

The system 600 includes a cross-correlation module 606 configured to calculate first and second cross-correlation values $R_Z(l)$ of the uplink signal for a first value of l and a second value of l, respectively, using the DMRS sequence for the first UE. The first and second values of l are selected such that the sum of the received power from the first UE and the second UE can be accurately estimated. In one embodiment, this can be accomplished by selecting values of l that enable the ratio of $$\frac{\pi l}{6}$$

to equal r2π, where r is a positive integer. The first and second values of l are used to calculate the first and second cross-correlation values. The values of l can be selected so that the first and second cross-correlation values are different. In one embodiment, equations 15 and 16 can be used to calculate the first and second cross-correlation values for l=12 and l=24.

The system 600 further comprises a noise power level module 608 configured to determine the noise power level 610 for the uplink signal 603 in the virtual MIMO system using the average autocorrelation value and the first and second cross-correlation values. For instance, equation (12) can be used to calculate the noise power level 610.

A substantially accurate estimation of the noise power level W for the uplink signal 603 in the virtual MIMO system can then be used to perform a channel estimate for the uplink signal and equalize the uplink signal from the first and second user equipment devices 605, 607. In one embodiment, the estimation of the noise power level and channel estimate may be performed at the base station 610 in the virtual MIMO system to allow the virtual MIMO uplink signal from the first UE and the second UE to be received at the base station. Alternatively, the DMRS module 602, autocorrelation module 604, cross-correlation module 606, and noise power level module 610 may be located external to and in communication with the base station 610.

Figure 7:
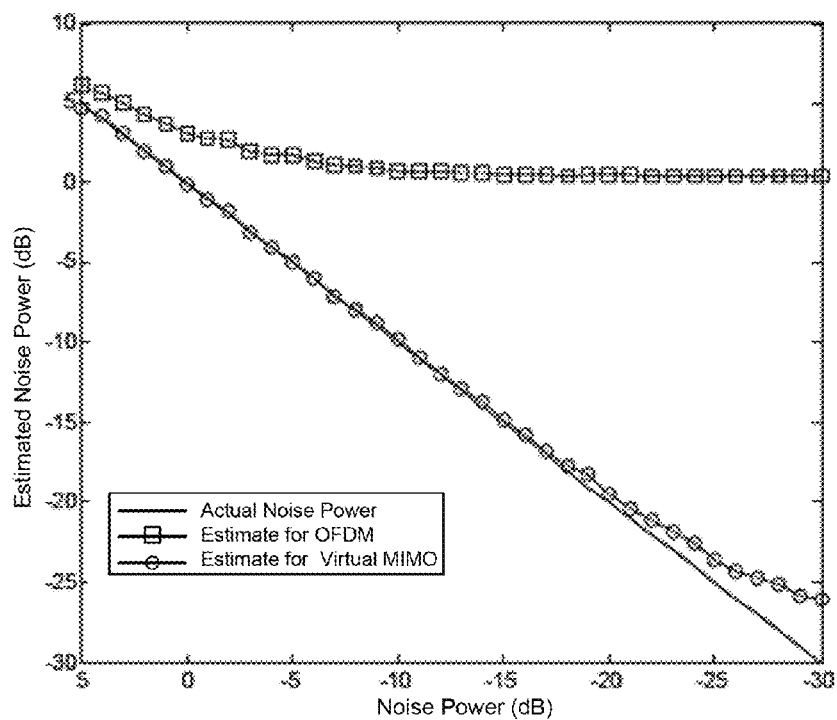
FIG. 7 illustrates a graph showing the noise power estimation vs. actual noise power for an uplink signal in a virtual MIMO system in accordance with an embodiment of the present invention.

FIG. 7 shows a graph of the noise power estimation 702 for an uplink signal for a virtual MIMO system including a first user equipment (UE) and a second UE. The estimation 702 is calculated with values of l that are selected so that the ratio of $$\frac{\pi l}{6}$$

is equal to r2π. When this occurs then the sum of the received power from the first UE and the second UE can be accurately estimated, thereby enabling an accurate estimation of noise power. A second estimate 704 is shown that uses an orthogonal frequency division multiplexing (OFDM) noise estimate that does not take into account the effects of the two user equipment devices in a virtual MIMO system. As can be seen, the estimate 702 of the noise power in the uplink signal of the virtual MIMO system is substantially closer to the actual noise power 706 than the estimate 704 that does not take into account the effects of the virtual MIMO system.

It should be understood that some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for estimating noise power in an uplink signal for a virtual multiple input multiple output (MIMO) system including a first user equipment (UE) and a second UE, comprising:
obtaining a demodulation reference signal (DMRS) receive symbol in the uplink signal;
determining a DMRS sequence for the first user equipment (UE) in the virtual MIMO system using a correlation calculation;
calculating an average autocorrelation value for N subcarriers in the uplink signal, wherein N is a positive non-zero integer and represents a total number of subcarriers in the uplink signal;
calculating a first cross-correlation value $R_Z(l)$ of the uplink signal for a first value of l subcarrier using the DMRS sequence for the first UE, wherein l is a positive non-zero integer;
calculating a second cross-correlation value $R_Z(l)$ of the uplink signal for a second value of l subcarriers using the DMRS sequence for the first UE, wherein the first and second values of l subcarriers are selected such that the sum of the two UEs' received power can be accurately estimated; and
determining the noise power level for the uplink signal in the virtual MIMO system using the average autocorrelation value and the first and second cross correlation values.

2. The method of claim 1, wherein obtaining the DMRS receive symbol further comprises obtaining the DRMS receive symbol at the $m^{th}$ symbol on the $n^{th}$ subcarrier, where m is a positive integer and n is an integer value between 1 and N.

3. The method of claim 1, further comprising selecting the first value of l as 12 and selecting the second value of l as 24.

4. The method of claim 1, further comprising selecting the first value of l and the second value of l such that the ratio of $$\frac{\pi l}{6}$$

is equal to $r2\pi$, where r is a positive integer, and the first value of l is not equal to the second value of l.

5. The method of claim 1, wherein calculating the average autocorrelation value for the N subcarriers further comprises calculating the average autocorrelation value $R_Y(0)$ using:

$$R_Y(0) = \frac{\sum_{n=1}^{N} Y_{m,n} Y_{m,n}^H}{N}$$

where $Y_{m,n}$ is received data at the $m^{th}$ symbol on the $n^{th}$ subcarrier and H is a conjugate transpose, wherein m and n are defined positive non-zero integers.

6. The method of claim 5, wherein calculating the first cross-correlation value further comprises calculating a cross correlation value multiplied by an autocorrelation of the DMRS sequence using:

$$R_Z(12) = \frac{\sum_{n=1}^{N-12} Y_{m,n} Y_{m,n+12}^H d_{m,n+12}^1 (d_{m,n}^1)^H}{N - 12}$$

where $Y_{m,n}$ is the received data at the $m^{th}$ symbol on the $n^{th}$ subcarrier, H is a conjugate transpose, and $d_{m,n}^1$ is the DMRS sequence of the first UE.

7. The method of claim 6, wherein calculating the second cross correlation value further comprises calculating a cross correlation value multiplied by the autocorrelation of the DMRS sequence using:

$$R_Z(24) = \frac{\sum_{n=1}^{N-24} Y_{m,n} Y_{m,n+24}^H d_{m,n+24}^1 (d_{m,n}^1)^H}{N - 24}.$$

8. The method of claim 7, further comprising determining noise power W for the uplink signal in the virtual MIMO system using:

$$W = R_Y(0) - \left( \frac{4R_Z(12) - R_Z(24)}{3} \right),$$

where $R_Y(0)$ is the average autocorrelation value, $R_Z(12)$ is the first cross-correlation value, and $R_Z(24)$ is the second cross-correlation value.

9. A method for estimating noise power in an uplink signal for a virtual multiple input multiple output (MIMO) system including a first user equipment (UE) and a second UE, comprising:
obtaining a demodulation reference signal (DMRS) receive symbol in the uplink signal at an $m^{th}$ symbol on an $n^{th}$ subcarrier, where m is a positive integer and n is an integer value between 1 and N and N is a positive non-zero integer and represents a total number of subcarriers in the uplink signal;
determining a DMRS sequence for the first UE in the virtual MIMO system using a correlation calculation;
calculating an average autocorrelation value for the N subcarriers;
calculating a first cross-correlation value $R_Z(12)$ for every $12^{th}$ subcarrier in the uplink signal using the DMRS sequence for the first UE;
calculating a second cross-correlation value $R_Z(24)$ for every $24^{th}$ subcarrier in the uplink signal using the DMRS sequence for the first UE; and
determining the noise power for the uplink signal in the virtual MIMO system using the average autocorrelation value and the first and second cross correlation values.

10. The method of claim 9, further comprising determining a signal power of the uplink signal for the first UE and the second UE in the virtual MIMO system using the first and second cross-correlation values.

11. The method of claim 9, wherein calculating the average autocorrelation value for the N subcarriers further comprises calculating the average autocorrelation value $R_Y(0)$ using:

$$R_Y(0) = \frac{\sum_{n=1}^{N} Y_{m,n} Y_{m,n}^H}{N}$$

where $Y_{m,n}$ is received data at the $m^{th}$ symbol on the $n^{th}$ subcarrier and H is a conjugate transpose, where m and n are defined positive non-zero integers.

12. The method of claim 11, wherein calculating the first cross-correlation value further comprises calculating a cross correlation value multiplied by an autocorrelation of the DMRS sequence using:

$$R_Z(12) = \frac{\sum_{n=1}^{N-12} Y_{m,n} Y_{m,n+12}^H d_{m,n+12}^1 (d_{m,n}^1)^H}{N-12}$$

where $Y_{m,n}$ is the received data at the $m^{th}$ symbol on the $n^{th}$ subcarrier, H is a conjugate transpose, and $d_{m,n}^1$ is the DMRS sequence of the first UE.

13. The method of claim 12, wherein calculating the second cross correlation value further comprises calculating a cross correlation value multiplied by the autocorrelation of the DMRS sequence using:

$$R_Z(24) = \frac{\sum_{n=1}^{N-24} Y_{m,n} Y_{m,n+24}^H d_{m,n+24}^1 (d_{m,n}^1)^H}{N-24}.$$

14. The method of claim 13, further comprising determining a signal power $S_1P_1+S_2P_2$ of the uplink signal using:

$$S_1P_1 + S_2P_2 = \frac{4R_Z(12) - R_Z(24)}{3},$$

where $S_i(i=1,2)$ is an average power of $UE_i(i=1,2)$, and $P_i(i=1,2)$ is an average power of a channel response on $UE_i$ channel (i=1,2), $R_Z(12)$ is the first cross-correlation value, and $R_Z(24)$ is the second cross-correlation value.

15. The method of claim 14, further comprising determining noise power W for the uplink signal in the virtual MIMO system using:

$$W = R_Y(0) - (S_1P_1 + S_2P_2).$$

16. The method of claim 13, further comprising determining noise power W for the uplink signal in the virtual MIMO system using:

$$W = R_Y(0) - \left(\frac{4R_Z(12) - R_Z(24)}{3}\right),$$

where $R_Y(0)$ is the average autocorrelation value, $R_Z(12)$ is the first cross-correlation value, and $R_Z(24)$ is the second cross-correlation value.

17. A system for estimating a noise power level in an uplink signal for a virtual MIMO system including a first user equipment (UE) and a second UE, comprising:
a demodulation reference signal (DMRS) module configured to obtain a DMRS receive symbol from the uplink signal and determine a DMRS sequence for the first UE in the virtual MIMO system using a correlation calculation, wherein the DMRS module is located in a digital memory device or is implemented in a hardware circuit;
an autocorrelation module configured to calculate an average autocorrelation value for N subcarriers in the uplink signal, wherein N is a positive non-zero integer and represents a total number of subcarriers in the uplink signal, wherein the autocorrelation module is located in a digital memory device or is implemented in a hardware circuit;
a cross-correlation module configured to calculate first and second cross-correlation values $R_Z(l)$ of the uplink signal for a first value of l subcarrier and a second value of l subcarrier, respectively, using the DMRS sequence for the first UE, wherein the first and second values of l sub-carriers are positive non-zero integers and are selected such that the sum of the received power from the first UE and the second UE can be accurately estimated, wherein the cross-correlation module is located in a digital memory device or is implemented in a hardware circuit; and
a noise power level module configured to determine the noise power level for the uplink signal in the virtual MIMO system using the average autocorrelation value and the first and second cross correlation values, wherein the noise power level module is located in a digital memory device or is implemented in a hardware circuit.

18. The system of claim 17, wherein the autocorrelation module is further configured to calculate the average autocorrelation value $R_Y(0)$ using:

$$R_Y(0) = \frac{\sum_{n=1}^{N} Y_{m,n} Y_{m,n}^H}{N}$$

where $Y_{m,n}$ is received data at the $m^{th}$ symbol on the $n^{th}$ subcarrier and H is a conjugate transpose, wherein m and n are defined positive non-zero integers.

19. The system of claim 17, wherein the cross-correlation module is further configured to select the first value of l and the second value of l such that the ratio of $$\frac{\pi l}{6}$$

is equal to $r2\pi$, where r is a positive integer, and the first value of l is not equal to the second value of l.

20. The system of claim 18, wherein the cross-correlation module is further configured to calculate the first cross correlation value for l=12 as a cross correlation value multiplied by an autocorrelation of the DMRS sequence for every $12^{th}$ subcarrier using:

$$R_Z(12) = \frac{\sum_{n=1}^{N-12} Y_{m,n} Y_{m,n+12}^H d_{m,n+12}^1 (d_{m,n}^1)^H}{N-12}$$

where $Y_{m,n}$ is the received data at the $m^{th}$ symbol on the $n^{th}$ subcarrier, H is a conjugate transpose, and $d_{m,n}^1$ is the DMRS sequence of the first UE.

21. The system of claim 20, wherein the cross-correlation module is further configured to calculate the second cross correlation value for l=24 as a cross correlation value multiplied by the autocorrelation of the DMRS sequence using:

$$R_Z(24) = \frac{\sum_{n=1}^{N-24} Y_{m,n} Y_{m,n+24}^H d_{m,n+24}^1 (d_{m,n}^1)^H}{N-24}.$$

22. The system of claim 21, wherein the noise power level module is further configured to determine noise power W for the uplink signal in the virtual MIMO system using:

$$W = R_Y(0) - \left(\frac{4R_Z(12) - R_Z(24)}{3}\right),$$

where $R_Y(0)$ is the average autocorrelation value, $R_Z(12)$ is the first cross-correlation value, and $R_Z(24)$ is the second cross-correlation value.

* * * * *